United States Patent
Tuchscherer et al.

(10) Patent No.: US 11,394,183 B2
(45) Date of Patent: Jul. 19, 2022

(54) KNIFE ACCESSORY FOR HOT STICK

(71) Applicant: Milwaukee Electric Tool Corporation, Brookfield, WI (US)

(72) Inventors: Andrew M. Tuchscherer, Milwaukee, WI (US); Scott M. Hangartner, Hartland, WI (US); Joseph M. DeBaker, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/239,005

(22) Filed: Jan. 3, 2019

(65) Prior Publication Data

US 2019/0199072 A1     Jun. 27, 2019

Related U.S. Application Data

(63) Continuation of application No. PCT/US2018/067192, filed on Dec. 21, 2018.

(60) Provisional application No. 62/609,769, filed on Dec. 22, 2017.

(51) Int. Cl.
| | |
|---|---|
| *H02G 1/02* | (2006.01) |
| *H02G 1/00* | (2006.01) |
| *B25G 3/36* | (2006.01) |
| *B25G 3/38* | (2006.01) |
| *B25G 1/12* | (2006.01) |

(52) U.S. Cl.
CPC ............. *H02G 1/02* (2013.01); *B25G 1/12* (2013.01); *B25G 3/36* (2013.01); *B25G 3/38* (2013.01); *H02G 1/005* (2013.01)

(58) Field of Classification Search
CPC .... B25G 1/12; B25G 3/36; B25G 3/38; F41C 27/16; F41C 27/18; H02G 1/005; H02G 1/02
USPC ............... 30/296.1, 297, 298, 298.4; 42/86; 81/180.1; 403/66
See application file for complete search history.

(56) References Cited

U.S. PATENT DOCUMENTS

| | | | | |
|---|---|---|---|---|
| 1,268,734 A | * | 6/1918 | Lay .................. | A46B 5/0083 403/66 |
| 1,416,626 A | * | 5/1922 | English .............. | B25G 3/38 403/66 |

(Continued)

FOREIGN PATENT DOCUMENTS

| | | |
|---|---|---|
| CA | 2577878 A1 | 8/2008 |
| CN | 201597020 U | 10/2010 |

(Continued)

OTHER PUBLICATIONS

International Search Report and Written Opinion for International Application No. PCT/US2018/067192, dated Jun. 24, 2019, 14 pages.

*Primary Examiner* — Clark F Dexter
(74) *Attorney, Agent, or Firm* — Reinhart Boerner Van Deuren s.c.

(57) ABSTRACT

A hot stick accessory with an attachment interface engageable with multiple types of attachment interfaces, including a shotgun-type attachment interface and a universal-type attachment interface. The accessory includes any of several operative components, such as a knife. The interface includes an attachment member with a first aperture and a plurality of second apertures arranged in an arc shape about the first aperture.

17 Claims, 13 Drawing Sheets

(56) References Cited

U.S. PATENT DOCUMENTS

| | | | |
|---|---|---|---|
| 1,420,925 A * | 6/1922 | Inghram | B25G 3/38 15/146 |
| 1,521,533 A * | 12/1924 | Henderson | B26B 5/00 30/317 |
| 2,750,616 A * | 6/1956 | Klugmann | A46B 5/0083 15/144.1 |
| 2,986,721 A | 5/1961 | Conright | |
| 3,200,674 A | 8/1965 | Crago | |
| 3,273,192 A * | 9/1966 | Mazzella | B05C 17/022 15/230.11 |
| 3,349,167 A | 10/1967 | Mixon, Jr. et al. | |
| 3,458,996 A | 8/1969 | Mixon, Jr. et al. | |
| 3,516,050 A | 6/1970 | Mixon, Jr. et al. | |
| 3,773,375 A * | 11/1973 | Nehls | E04D 13/106 37/268 |
| 3,866,965 A | 2/1975 | Homeier | |
| 3,888,534 A | 6/1975 | Hall | |
| 4,047,821 A | 9/1977 | Hoke et al. | |
| 4,079,978 A | 3/1978 | McMullin | |
| 4,326,316 A | 4/1982 | Dolenti | |
| 4,402,540 A | 9/1983 | Willem et al. | |
| 4,805,494 A * | 2/1989 | Santoro | B25D 1/00 81/177.8 |
| 5,207,755 A * | 5/1993 | Ampian | A46B 5/0075 15/144.1 |
| 5,547,305 A | 8/1996 | Treche | |
| 5,564,852 A | 10/1996 | Maxwell et al. | |
| 5,593,196 A | 1/1997 | Baum et al. | |
| 6,155,620 A * | 12/2000 | Armstrong | A01B 1/00 15/105 |
| 6,189,222 B1 * | 2/2001 | Doyle | B26B 21/523 15/144.1 |
| 6,923,094 B1 * | 8/2005 | Marquardt | B23Q 5/045 81/177.8 |
| 6,995,313 B1 | 2/2006 | Barnett et al. | |
| 7,154,281 B2 | 12/2006 | Piesinger | |
| 7,181,995 B2 | 2/2007 | Rider | |
| 7,213,294 B2 * | 5/2007 | Karroll | B05C 17/022 15/144.1 |
| 7,775,570 B2 | 8/2010 | Taylor | |
| 7,984,665 B1 | 7/2011 | Robertson | |
| 9,431,157 B2 | 8/2016 | Niles | |
| 9,486,060 B1 * | 11/2016 | Cara | A46B 5/0058 |
| 2004/0160227 A1 | 8/2004 | Piesinger | |
| 2005/0174126 A1 | 8/2005 | Piesinger | |
| 2005/0238803 A1 | 10/2005 | Tremel et al. | |
| 2006/0123578 A1 * | 6/2006 | Rickstrew | B05C 17/022 15/230.11 |
| 2006/0139342 A1 | 6/2006 | Yu | |
| 2006/0150779 A1 | 7/2006 | Rider | |
| 2006/0283546 A1 | 12/2006 | Tremel et al. | |
| 2006/0284556 A1 | 12/2006 | Tremel et al. | |
| 2007/0034669 A1 | 2/2007 | De la Torre et al. | |
| 2007/0075626 A1 | 4/2007 | Yu et al. | |
| 2007/0119608 A1 | 5/2007 | Morris et al. | |
| 2008/0265593 A1 | 10/2008 | Woodworth | |
| 2009/0091147 A1 | 4/2009 | Taylor | |
| 2010/0101059 A1 | 4/2010 | Seguin et al. | |
| 2011/0101716 A1 | 5/2011 | Nolte et al. | |
| 2012/0284997 A1 | 11/2012 | Morin et al. | |
| 2013/0033052 A1 | 2/2013 | Stinson | |
| 2014/0202610 A1 | 7/2014 | Niles | |
| 2016/0141847 A1 | 5/2016 | Kenny | |
| 2016/0336723 A1 | 11/2016 | Niles | |
| 2017/0314997 A1 | 11/2017 | Baum et al. | |
| 2018/0126541 A1 * | 5/2018 | Jeremenko | B25J 1/04 |

FOREIGN PATENT DOCUMENTS

| | | |
|---|---|---|
| CN | 103414125 A | 11/2013 |
| CN | 204068036 U | 12/2014 |
| CN | 204927968 U | 12/2015 |
| CN | 205724655 U | 11/2016 |
| JP | 06-285812 | 10/1994 |
| JP | 2010-239794 | 10/2010 |
| KR | 20-0335237 | 12/2003 |

* cited by examiner

KNIFE ACCESSORY FOR HOT STICK

CROSS-REFERENCE TO RELATED PATENT APPLICATION

This application is a continuation of International Application No. PCT/US2018/067192, filed Dec. 21, 2018, which claims priority from U.S. Application No. 62/609,769, filed Dec. 22, 2017, the contents of each of which are incorporated herein in their entirety.

BACKGROUND OF THE INVENTION

The present disclosure relates to elongate poles, such as hot sticks. More particularly this disclosure relates to accessories for elongate poles.

Hot sticks are extensions made of non-conductive material (e.g., fiberglass) and are typically used by linemen to reach overhead power utility cables. Some hot sticks include an attachment interface to which a variety of different accessories may be secured. There are at least two standard design types of interfaces for hot sticks: shotgun or universal.

SUMMARY OF THE INVENTION

This disclosure describes various accessories for elongate poles, such as hot sticks. The accessories are compatible with both the shotgun-type interface design type and the universal-type interface design type, including being compatible with at least several of the universal-type versions.

In one embodiment, an attachment for a hot stick comprises an operative component, such as a blade, a handle rigidly coupled to the operative component, and an attachment component rigidly coupled to the handle. The attachment component comprises a hook receptacle configured to receive a shotgun-type hot stick attachment interface. The hook receptacle has a diameter between 11.6 mm and 12.0 mm along a first axis and between 12.0 mm and 12.4 mm along a second axis perpendicular to the first axis. The hook receptacle is defined in part by an arc-shaped component extending from an end of the hook receptacle. A peripheral edge of the arc-shaped component is between 9.85 mm and 10.25 mm from a center point that is located within the hook receptacle.

The attachment component also comprises a plurality of teeth receptacles configured to receive a universal-type attachment interface. The plurality of teeth receptacles are arranged in an arc around the hook receptacle. The side edges of the plurality of teeth receptacles are radially aligned with the center point and are 15 arc degrees apart with respect to the center point. Neighboring side edges of neighboring teeth receptacles are 15 arc degrees apart with respect to the center point. An interior edge of the plurality of teeth receptacles is between 9.85 mm and 10.25 mm from the center point.

In another embodiment, an elongated tool, such as a hot stick, comprises an elongate handle at a first end and an attachment engageable with a second end of the handle opposite the first end. The attachment comprises a blade and an attachment component rigidly coupled to the blade. The attachment component comprises a hook receptacle defined in part by an arc-shaped component extending from an end of the hook receptacle. An outer peripheral edge of the arc-shaped component is between 9.85 mm and 10.25 mm from a center point located within the hook receptacle. The attachment component also comprises a plurality of teeth receptacles that are arranged in an arc around the hook receptacle. Side edges of the plurality of teeth receptacles are aligned with the center point and the side edges of a given teeth receptacle are 15 arc degrees apart with respect to the center point.

In another embodiment, a method of using a elongated tool, such as a hot stick, is described. The method comprises engaging a first hot stick with a hot stick attachment, the first hot stick comprising a first attachment interface. The hot stick attachment comprises an operative component, such as a blade, and an attachment component rigidly coupled to the operative component. The attachment component comprises a hook receptacle configured to receive the hot stick attachment of the first hot stick. The hook receptacle is defined in part by an arc-shaped component extending from an end of the hook receptacle. An outer peripheral edge of the arc-shaped component is between 9.85 mm and 10.25 mm from a center point located within the hook receptacle. The attachment component also comprises a plurality of teeth receptacles arranged in an arc around the hook receptacle. The side edges of the plurality of teeth receptacles are aligned with the center point and the side edges of a given teeth receptacle are 15 arc degrees apart with respect to the center point.

The method further comprises disengaging the hot stick attachment from the first hot stick and subsequently engaging the hot stick attachment with a second hot stick. The second hot stick comprises a second attachment interface that engages with the plurality of teeth receptacles.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of an accessory for a hot stick are shown. Attachment types for extension poles, such as hot sticks, have generally been of two design types: a shotgun-type or a universal-type. The universal type includes several versions, such as the Salisbury spline, the Chance spline, the Hastings spline(s) and the Kearney spline. This disclosure describes various embodiments that are compatible with both the shotgun-type interface and the universal-type interface, including being compatible with multiple versions of the universal-type interface.

One embodiment of the disclosure provides, in one aspect, a knife including a handle including a first end and a second end opposite the first end. A blade extends from the first end of the handle, and an attachment component, shown as an attachment member, extends from the second end of the handle. The attachment member includes a first aperture extending through the attachment member and a plurality of second apertures extending through the attachment member. The first aperture is partially defined by an arc component that extends from an end of the attachment member. The second apertures are arranged in an arc shape about a center located within the first aperture.

The second apertures are axially centered around a center-point within the hook receptacle, although the center-point is necessarily the center of hook receptacle. The second apertures have a width of around 15 degrees of arc ("15 arc degrees") with respect to the center-point, and a further 15 degrees of arc separate neighboring second apertures. The distance from the center-point to an outer periphery of the arc component is generally equivalent to the distance from the center-point to the outer edges of the second apertures.

Figure 1:
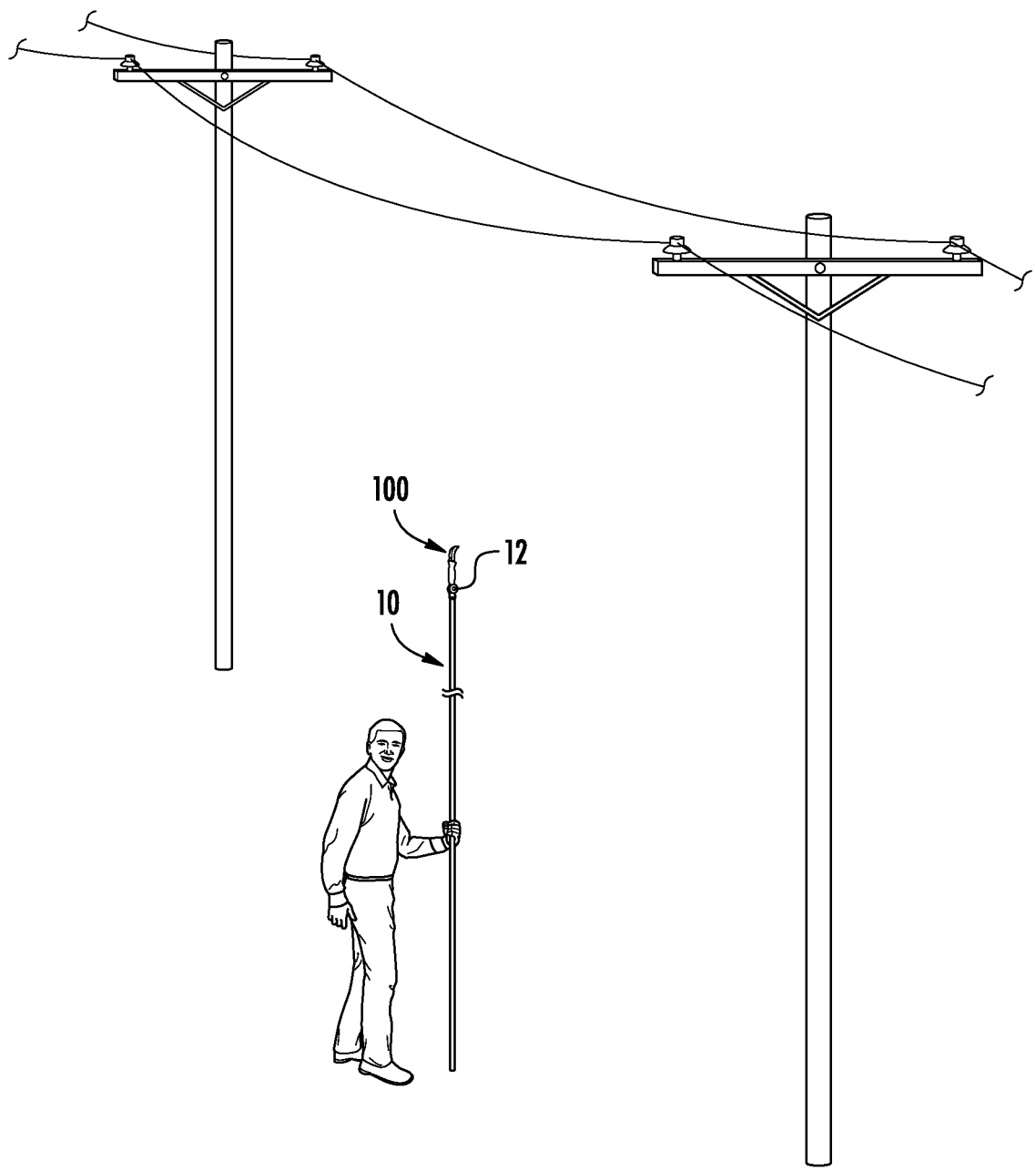
FIG. 1 is a perspective view of a user with a hot stick in a work environment, according to an embodiment.
Figure 2:
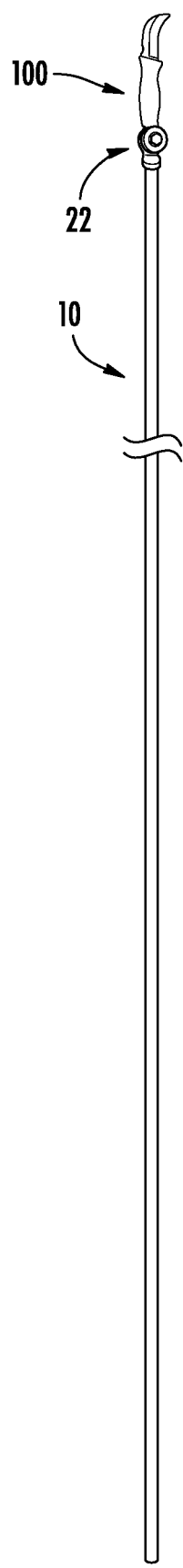
FIG. 2 is a perspective view of a hot stick with a universal-type attachment interface, according to an embodiment.
Figure 3:
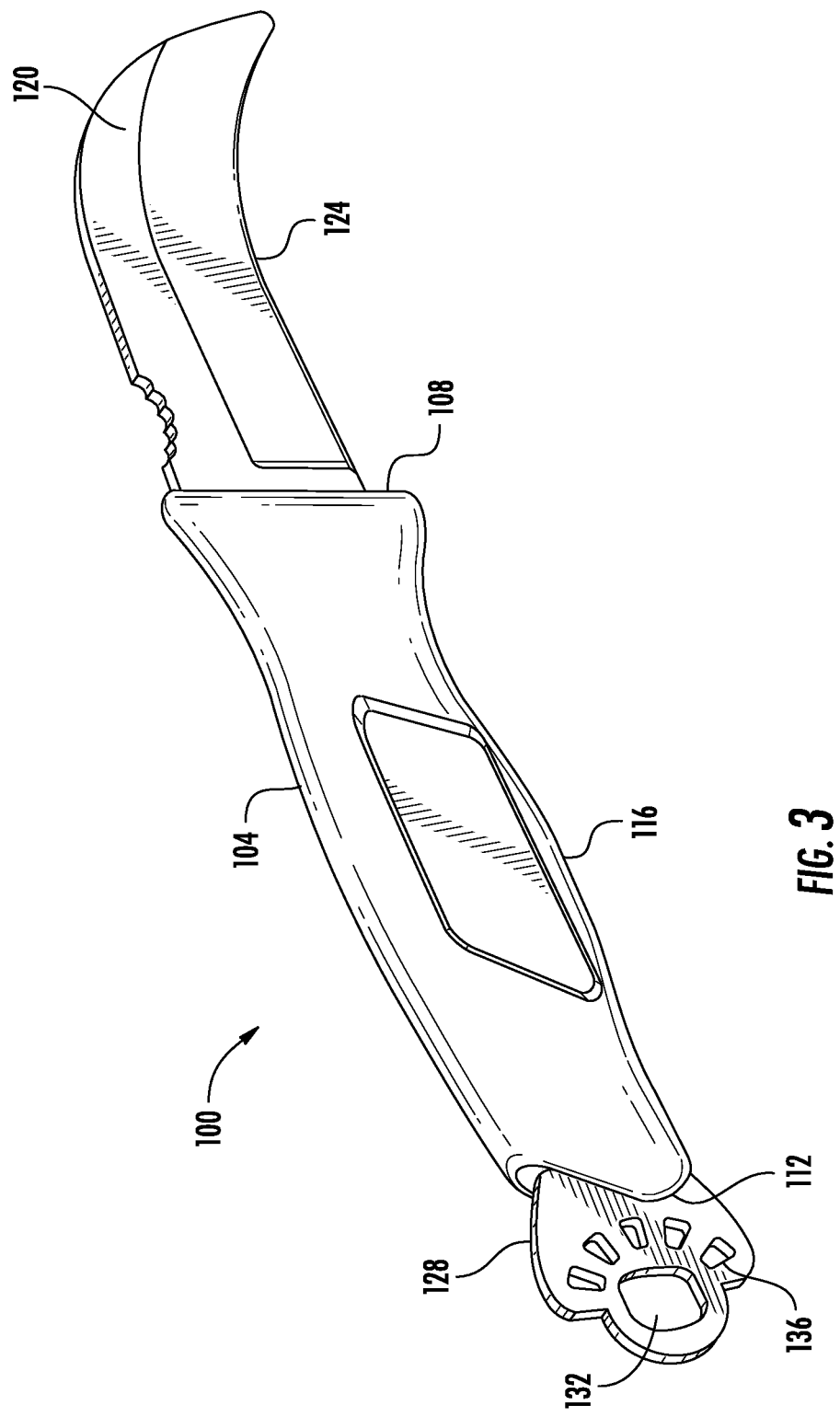
FIG. 3 is a perspective view of a knife accessory, according to an embodiment.
Figure 4:
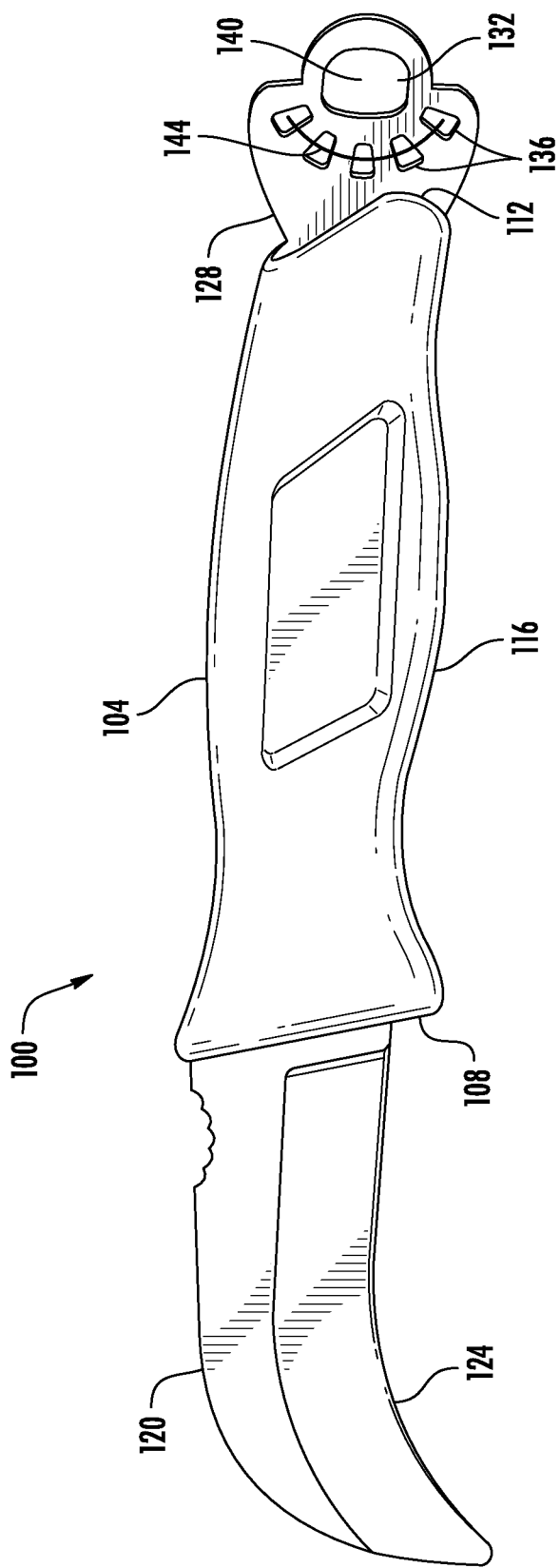
FIG. 4 is a side view of a knife accessory, according to an embodiment.

With reference to FIGS. 1-2, an extension pole for use with various attached tools, shown as hot stick 10 for interacting with electrical wires, is shown. Hot stick 10 includes general attachment interface 12 that is one of shotgun-type attachment interface 14 or universal-type attachment interface 22. Attachment interface 12 couples knife accessory 100 to hot stick 10. Knife accessory 100 is coupled to hot stick 10 via universal-type attachment interface 22 on hot stick 10. In this embodiment accessory 100 is shown as knife accessory 100 and comprises blade 120, although it is contemplated that accessory 100 can comprise other operative components other than blade 120 (e.g., clamps).

FIGS. 3-7 illustrate various embodiments of knife accessory 100. Knife accessory 100 includes handle 104 having first or front end 108, second or rear end 112 opposite the front end 108, and grip area 116 disposed between front and rear ends 108, 112. Blade 120 extends from front end 108 of handle 104. Blade 120 is rigidly coupled to handle 104, but in other embodiments, blade 120 is pivotally coupled to handle 104 so as to be pivotable between an extended position and a retracted position. In other embodiments, blade 120 is a removable blade coupled to a blade carrier. In the illustrated embodiment, blade 120 includes smooth cutting edge 124 that has a curved, generally hook-shaped contour. In other embodiments, cutting edge 124 has other shapes and is entirely or partially serrated.

Knife accessory 100 further comprises attachment member 128 extending from rear end 112 of handle 104. Attachment member 128 comprises first aperture or hook receptacle 132 and a plurality of teeth receptacles or second apertures 136 arranged in an arcuate shape about center 140. There are five second apertures 136 in the illustrated embodiment, and second apertures 136 are evenly spaced along arc 144 that is between about 90 degrees and about 180 degrees in length. In some embodiments, arc 144 is between about 90 degrees and about 120 degrees in length. In some embodiments, a greater or lesser number of second apertures 136 than the five apertures 136 depicted in FIGS. 3-7 may be provided (e.g., seven apertures 136).

In the illustrated embodiment, first aperture 132 and second apertures 136 are closed (i.e. apertures 132, 136 have no gaps in their respective perimeters). First aperture 132 is generally D-shaped and defined by arc-shaped component 164, and second apertures 136 are generally trapezoidal. However, it is contemplated herein that apertures 132, 136 may have other shapes. In an alternative embodiment, first aperture 132 comprises an opening or gap in its perimeter. In such an embodiment, a gate (e.g., spring loaded) may be provided to close the gap such that the gate can be opened to selectively allow a fastener to be inserted into or removed from the first aperture through the gap.

Figure 5:
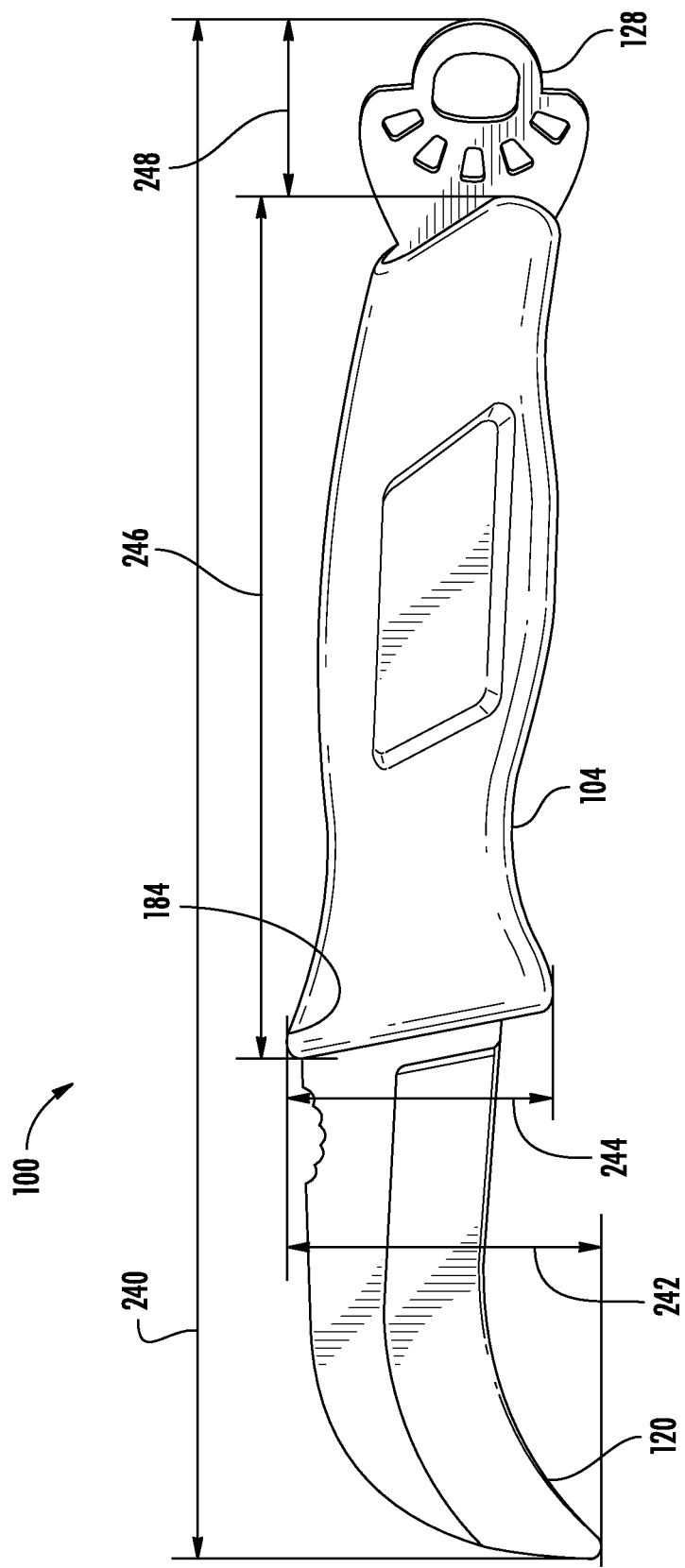
FIG. 5 is a side view of a knife accessory showing various dimensions, according to an embodiment.
Figure 6:
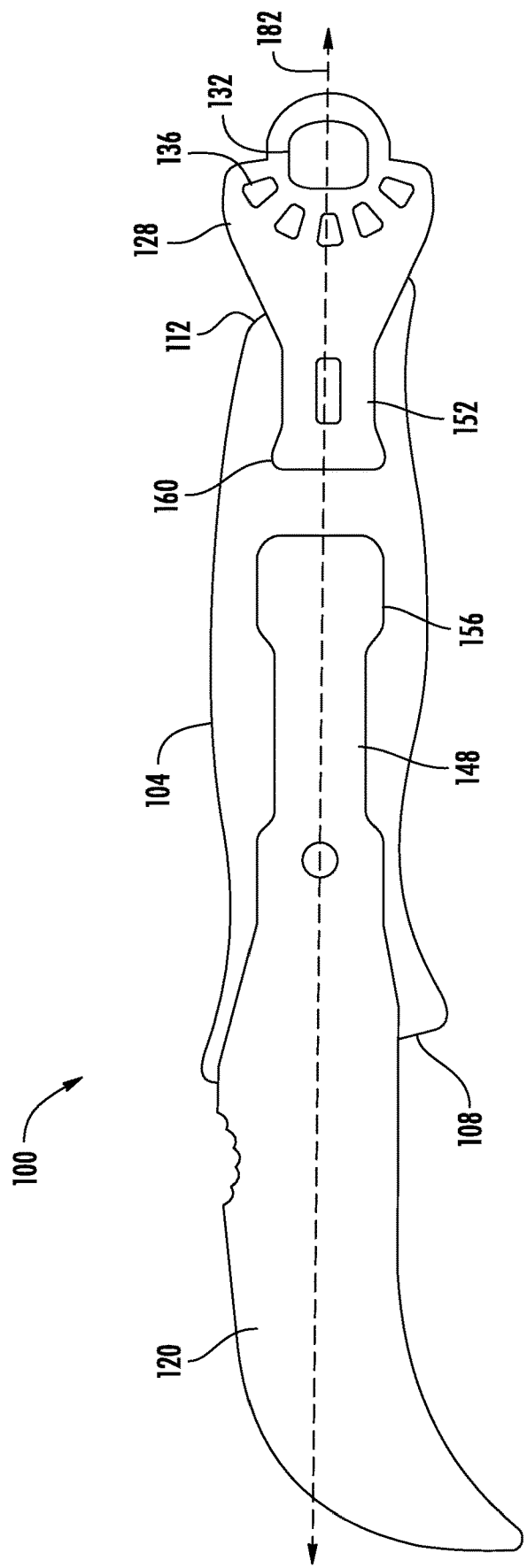
FIG. 6 is a cross-sectional view of a knife accessory, according to an embodiment.

Turning to FIG. 5, in one embodiment length 240 of knife accessory 100 is 244.6 mm and blade 120 curves to 53.0 mm from edge 184 of handle 104. Handle 104 has a length 246 of 137.6 mm along the longitudinal axis of knife accessory 100, and a width 244 of 41.2 mm. Attachment member 128 extends for a distance 248 of 29.0 mm past handle 104 along the longitudinal axis of knife accessory 100. Attachment member 128 has a thickness of 3.0 mm, or more generally attachment member 128 has a thickness between 2.9 mm and 3.1 mm. These dimensions are not intended to limit the scope of the overall disclosure and instead are provided to illustrate the details of one particular embodiment.

Blade 120 includes tang 148 that extends into handle 104 toward rear end 112. Attachment member 128 includes tang 152 that extends into handle 104 toward front end 108. In the illustrated embodiment, tang 148 has an enlarged end portion 156, and tang 152 has an enlarged end portion 160. Blade 120 and attachment member 128 are separate components in the illustrated embodiment, and may be made of metal (e.g., steel) via a stamping process or a forging process. In other embodiments, blade 120 and attachment member 128 may be integrally formed together as a single piece.

Figure 7:
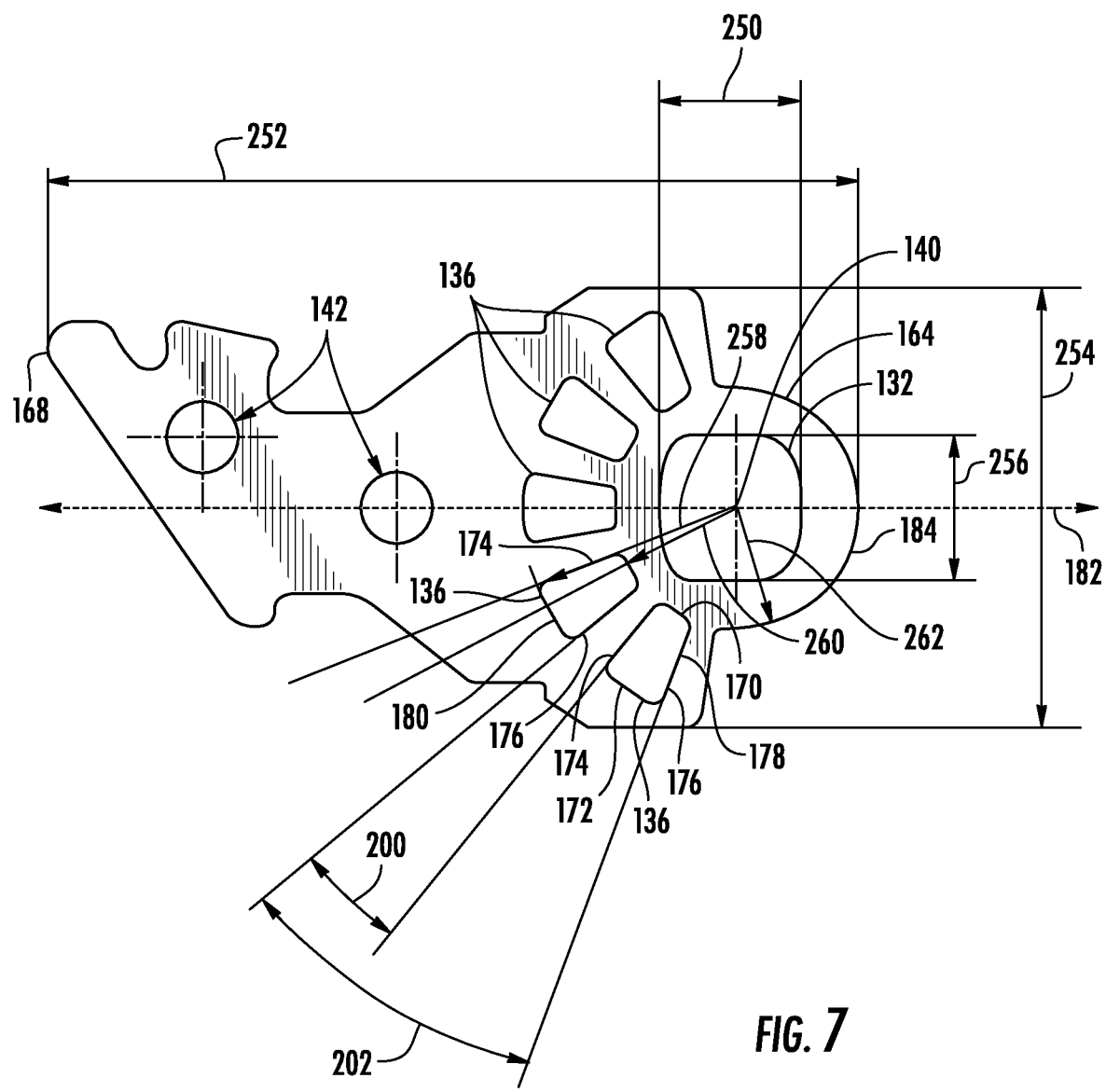
FIG. 7 is a side view of an attachment member of a knife accessory, according to an embodiment.

Turning to FIG. 7, illustrated therein is a specific embodiment of attachment member 128. Attachment member 128 includes hook receptacle 132 and teeth receptacles shown as second apertures 136. Second apertures 136 are arranged in an arc around center 140. Center 140, shown as center point 140, is located within hook receptacle 132, although in this embodiment center 140 is not the center of hook receptacle 132. Interior edge 170 is 10.05 mm from center 140 and exterior edge 172 is 17.5 mm from center 140. More generally, distance 260 from interior edge 170 to center 140 is between 9.85 mm and 10.25 mm, and distance 258 from exterior edge 172 to center 140 is between 17.3 mm and 17.7 mm. The remaining apertures 142 in attachment member 128 have a diameter of 6.0 mm, and are used to fixedly couple attachment member 128 to handle 104.

First side edges 174 and second side edges 176 of second apertures 136 are radially aligned with center 140. Angle 202 between first side edges 174 of neighboring teeth receptacles 178, 180 is 30 degrees. Angle 200 between neighboring side edges of neighboring second apertures 136 (e.g., second side edge of first teeth receptacle 178 and first side edge of second teeth receptacle 180) is 15 degrees.

Length 252 of attachment member 128 is 66.7 mm along longitudinal axis 182, and length 250 of hook receptacle 132 along longitudinal axis 182 is 11.8 mm. More generally, length 250 of hook receptacle 132 along longitudinal axis 182 is between 11.6 mm and 12.0 mm. Width 254 of attachment member 128, which is perpendicular to longitudinal axis 182, is 36 mm, and width 256 of hook receptacle 132, which is perpendicular to longitudinal axis 182, is 12.2 mm. More generally, width 256 of hook receptacle 132, which is perpendicular to longitudinal axis 182, is between 12.0 mm and 12.4 mm. Radial length 262 from center 140 to outer peripheral edge 184 of exterior arc-shaped component 164 is 10.05 mm. More generally, radial length 262 from center 140 to outer peripheral edge 184 is between 9.85 mm and 10.25 mm.

Figure 8:
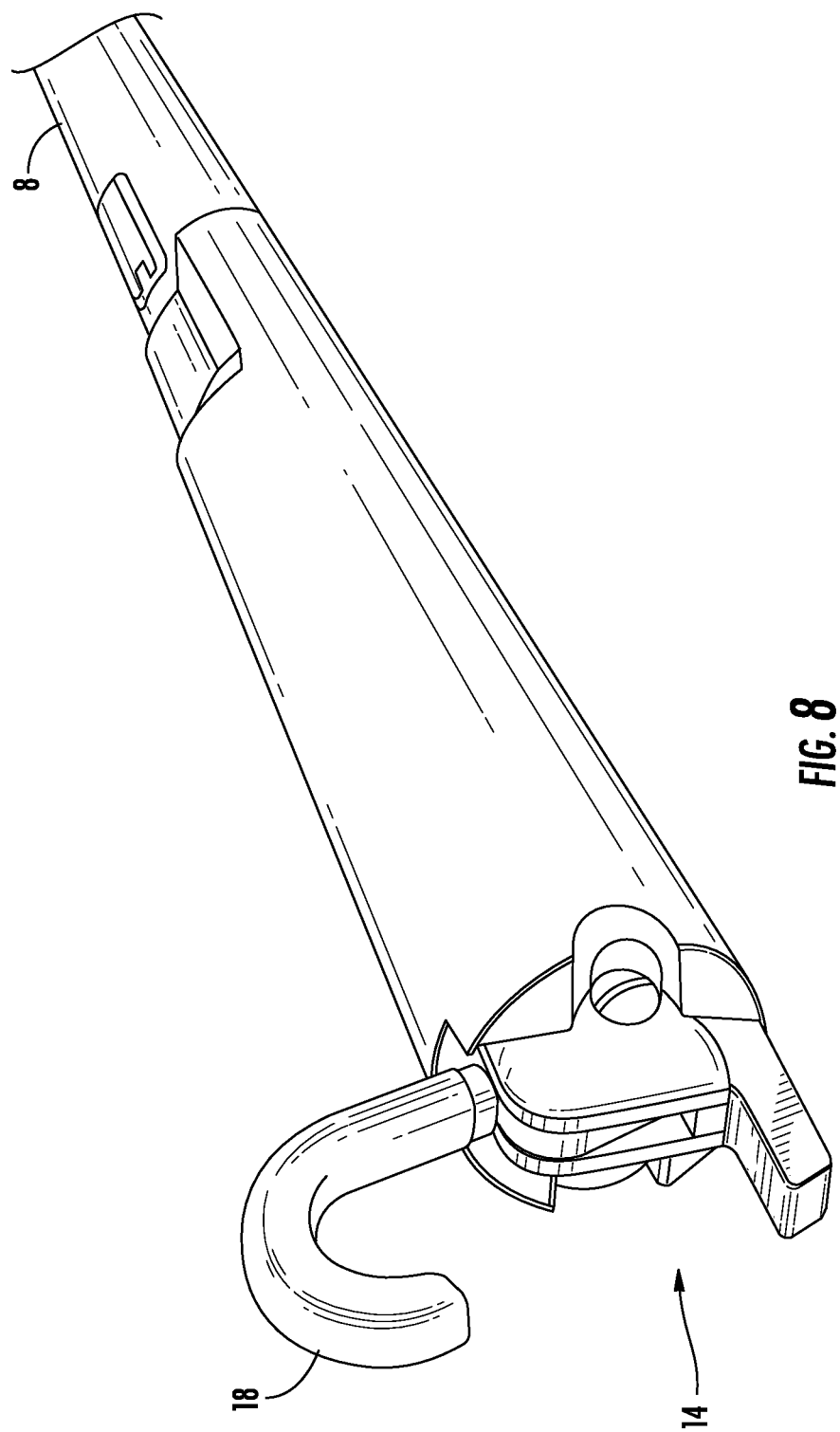
FIG. 8 is a perspective view of a hot stick including a shotgun-type attachment interface, according to an embodiment.
Figure 9:
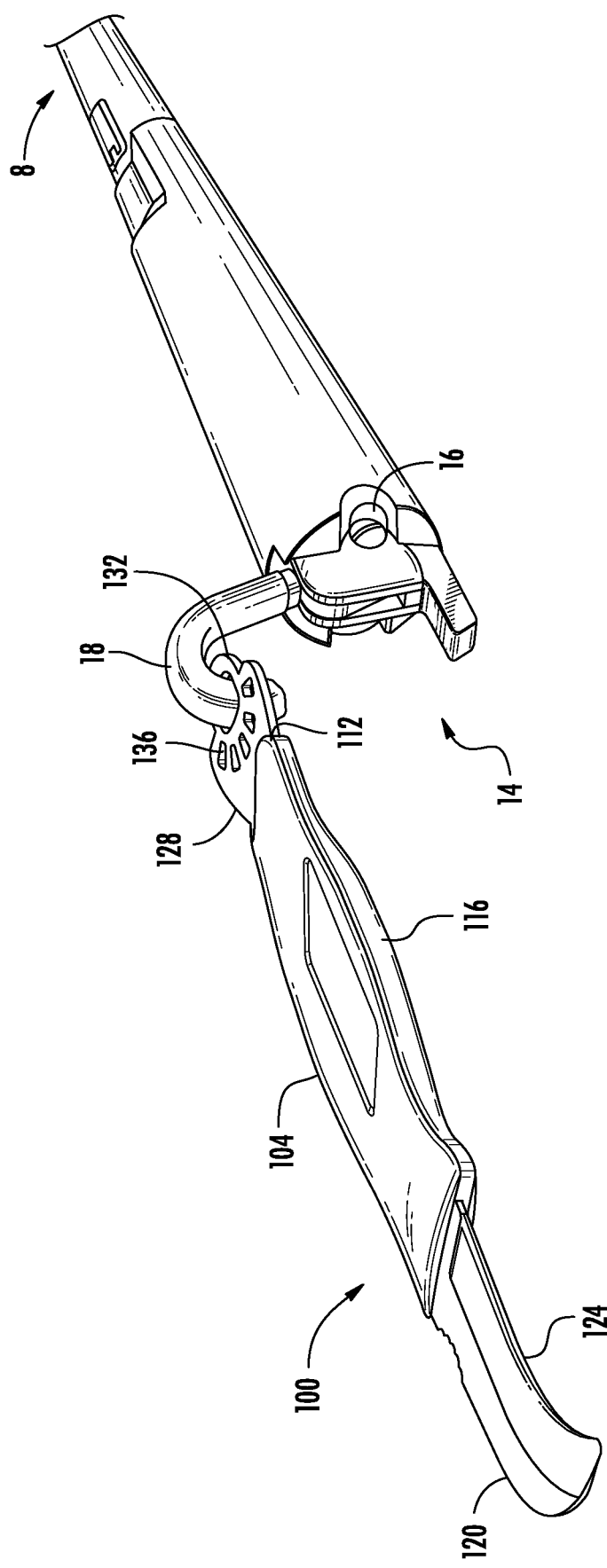
FIG. 9 is a perspective view of a hot stick including a shotgun-type attachment interface coupled to a knife accessory, according to an embodiment.
Figure 10:
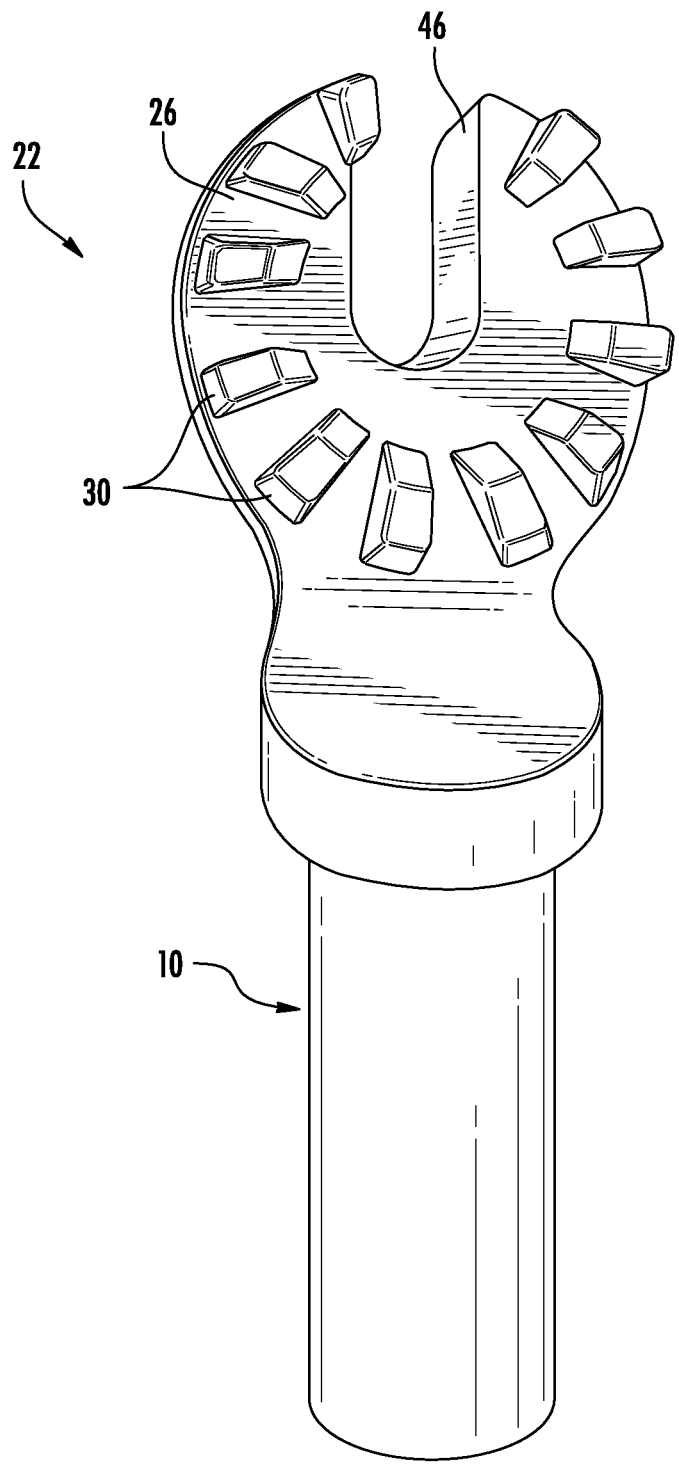
FIG. 10 is a perspective view of a hot stick including a universal-type attachment interface, according to an embodiment.
Figure 11:
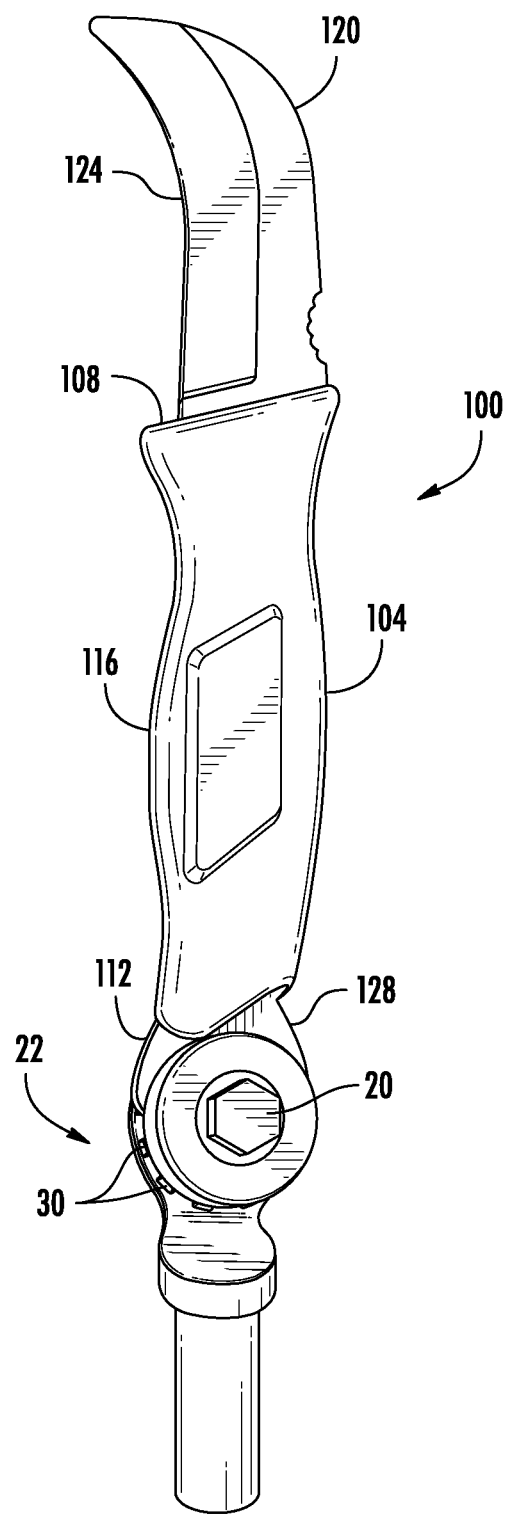
FIG. 11 is a perspective view of a hot stick including a universal-type attachment interface coupled to a knife accessory, according to an embodiment.
Figure 12:
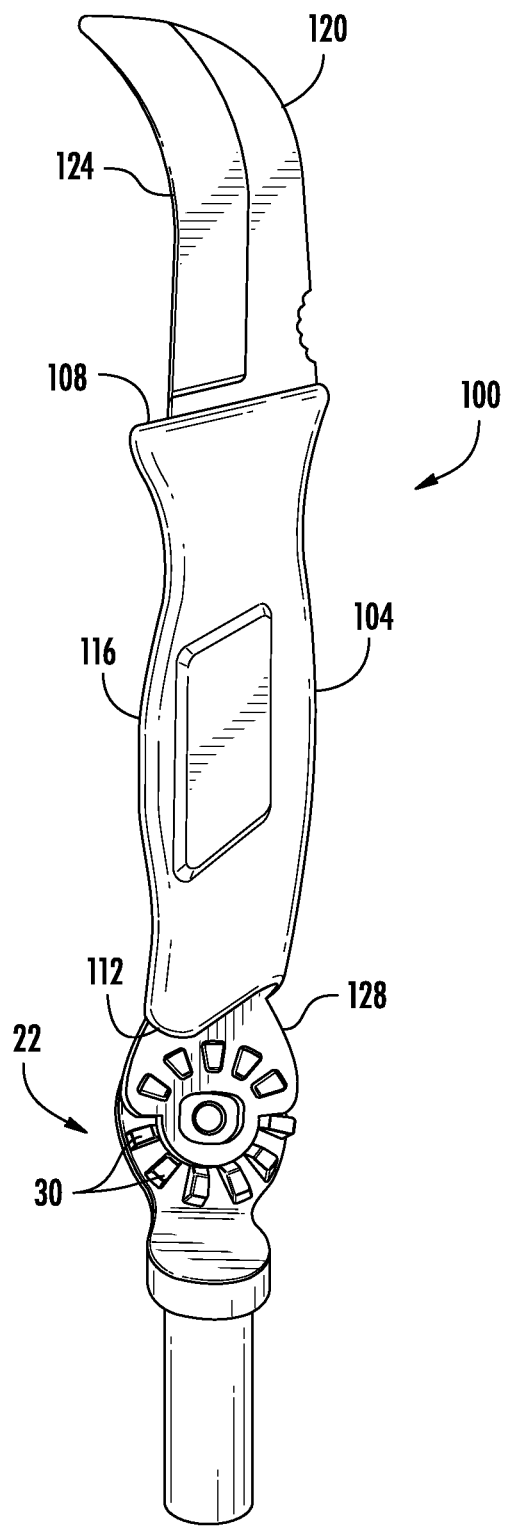
FIG. 12 is a perspective view of a hot stick including a universal-type attachment interface coupled to a knife accessory, according to an embodiment.
Figure 13:
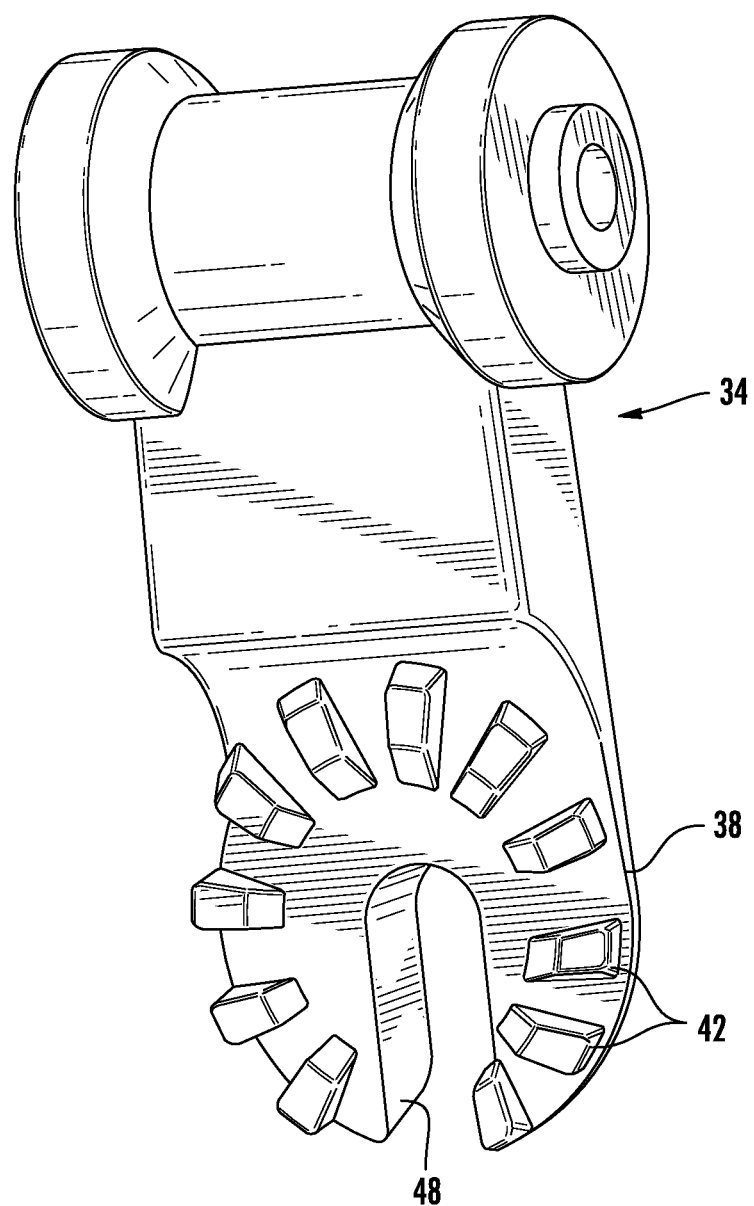
FIG. 13 is a perspective view of a universal-interface type accessory interface, according to an embodiment.

With reference to FIGS. 8-9, a shotgun-type attachment interface 14 includes a pivoting hook 18 that is engageable with a loop or ring on an accessory. To attach knife accessory 100 to hot stick 8 with a shotgun-type attachment interface 14, the user extends the hook 18 of the shotgun-type attachment interface 14 through the first aperture 132, then pivots the hook 18 to a closed position. Hook 18 is then retracted toward shotgun-type attachment interface 14, pulling attachment member 128 of knife accessory 100 within receiving aperture 16 (best shown FIG. 9).

Turning to FIGS. 10-13, a universal-type attachment interface 22 includes a guide plate 26 and a plurality of projections or teeth 30 extending from guide plate 26 and arranged in a circular or arcuate shape. To attach knife accessory 100 to a hot stick with a universal-type attachment interface 22, the user aligns teeth 30 of attachment interface 22 with second apertures 136 and inserts teeth 30 into second apertures 136. The user then inserts fastener 20 through first aperture 132 and through slot or aperture 46 in attachment interface 22, and tightens fastener 20 to lock teeth 30 in place within second apertures 136.

Universal-type accessory 34 includes a guide plate 38 and corresponding teeth 42 that are engageable with teeth 30 on attachment interface 22 in an interlocking manner to couple accessory 34 to attachment interface 22 in a variety of different rotational positions. Attachment interface 22 and accessory 34 each include a slot or aperture 46, 48, respectively, in guide plate 26, 38 that can receive a fastener 20 (e.g., a nut and bolt). Fastener 20 presses guide plates 26, 38 toward one another to lock accessory 34 in a desired rotational position. In some embodiments, the second apertures 136 may be replaced with a corresponding plurality of projections or teeth (such as teeth 42 of accessory 34 illustrated in FIG. 13).

Thus, attachment member 128 allows knife accessory 100 to be attached to two types of attachment interfaces 12, including a shotgun-type attachment interface 14 and a universal-type attachment interface 22. As such, knife accessory 100 can be conveniently attached to any type of hot stick to facilitate performing a wide variety of tasks (e.g., cutting insulation on overhead wires).

In one embodiment, knife accessory 100 includes a blade 120 that is pivotably coupled to handle 104, allowing blade 120 to be at least partially retracted into a blade receiving area between the opposing sides of handle 104. Attachment member 128 is also pivotably coupled to handle 104, allowing attachment member 128 to also be partially retracted into an attachment member receiving area the opposing sides of handle 104. In one exemplary embodiment, attachment member 128 and blade 120 may be aligned on different planes so that when attachment member 128 and blade 120 are both retracted into handle 104, then attachment member 128 and blade 120 do not interfere with the position of the other respective component within handle 104. In another exemplary embodiment, attachment member 128 and blade 120 are coplanar and pivot on the same plane but handle 104 is sufficiently long so that both attachment member 128 and blade 120 can be retracted within handle 104 without interfering with the position of the other respective component within handle 104.

Although the invention has been described in detail with reference to certain preferred embodiments, variations and modifications exist within the scope and spirit of one or more independent aspects of the invention as described. For example, for each of the measurements provided (e.g., length of hook receptacle 132 along longitudinal axis 182 is between 11.6 mm and 12.0 mm generally in one or more embodiments), for various embodiments the distance measurements have a margin of error tolerance (e.g., for manufacturing allowances) that expands the range 0.5 mm in either direction. In various other embodiments the distance measurements have a margin of error tolerance (e.g., for manufacturing purposes) that expands the range 1.0 mm in either direction. Similarly, for each angle (e.g., 15 degrees between sidewalls of a given teeth receptacle 136), for various embodiments the angle measurements have a margin of error tolerance (e.g., for manufacturing allowances) of one degree in either direction from the specified angle. In various other embodiments the angle measurements have a margin of error tolerance (e.g., for manufacturing allowances) of two degrees in either direction from the specified angle.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. An attachment for a hot stick comprising:
    an operative component;
    a handle rigidly coupled to the operative component; and
    an attachment component rigidly coupled to the handle, the attachment component comprising:
        a hook receptacle configured to receive a shotgun-type hot stick attachment interface, the hook receptacle has a length between 11.6 mm and 12.0 mm along a first axis and between 12.0 mm and 12.4 mm along a second axis perpendicular to the first axis, the hook receptacle is defined in part by an arc-shaped component extending from an end of the hook receptacle, an outer peripheral edge of the arc-shaped component is between 9.85 mm and 10.25 mm from a center point;
        a plurality of teeth receptacles configured to receive a universal-type attachment interface, wherein:
            the plurality of teeth receptacles are arranged in an arc around the hook receptacle;
            side edges of each of the plurality of teeth receptacles are radially aligned with the center point, the side edges of a given teeth receptacle are 15 arc degrees apart with respect to the center point, and neighboring side edges of neighboring teeth receptacles are 15 arc degrees apart with respect to the center point; and
            an interior edge of each of the plurality of teeth receptacles is between 9.85 mm and 10.25 mm from the center point.

2. The attachment of claim 1, wherein an outer peripheral edge of the arc is 10.05 mm from the center point.

3. The attachment of claim 2, wherein the interior edge of each of the plurality of teeth receptacles is 10.05 mm from the center point.

4. The attachment of claim 1, wherein the operative component comprises a blade.

5. The attachment of claim 1, wherein the hook receptacle has a length of 11.8 mm along the first axis and 12.2 mm along the second axis.

6. An elongated tool comprising:
    an elongated structure;
    an attachment member detachably engaged with a first end of the elongated structure, the attachment member comprising:
        a blade;
        an attachment component rigidly coupled to the blade, the attachment component comprising:
            a hook receptacle defined in part by an arc-shaped component extending from an end of the hook receptacle, an outer peripheral edge of the arc-shaped component is between 9.85 mm and 10.25 mm from a center point located within the hook receptacle, the hook receptacle has a length between 11.6 mm and 12.0 mm along a first axis and between 12.0 mm and 12.4 mm along a second axis perpendicular to the first axis; and
            a plurality of teeth receptacles, wherein:
                the plurality of teeth receptacles are arranged in an arc around the hook receptacle;
                side edges of each of the plurality of teeth receptacles are aligned with the center point and the side edges of a given teeth receptacle are 15 arc degrees apart with respect to the center point; and
                an interior edge of each of the plurality of teeth receptacles is between 9.85 mm and 10.25 mm from the center point.

7. The elongated tool of claim 6, wherein neighboring side edges of neighboring teeth receptacles are 15 arc degrees apart with respect to the center point.

8. The elongated tool of claim 6, wherein the plurality of teeth receptacles comprise five teeth receptacles.

9. The elongated tool of claim 6, wherein the attachment member comprises a handle, and wherein the blade and the attachment component are rigidly coupled to opposing ends of the handle.

10. A method of using a hot stick attachment comprising:
    engaging a first hot stick with a hot stick attachment, the first hot stick comprising a first attachment interface, the hot stick attachment comprising:
        an operative component;
        an attachment component rigidly coupled to the operative component, the attachment component comprising:
            a hook receptacle that receives the first attachment interface of the first hot stick, the hook receptacle is defined in part by an arc-shaped component extending from an end of the hook receptacle, an outer peripheral edge of the arc-shaped component is 10.05 mm from a center point located within the hook receptacle, the hook receptacle has a length between 11.6 mm and 12.0 mm along a first axis and between 12.0 mm and 12.4 mm along a second axis perpendicular to the first axis;
            a plurality of teeth receptacles, wherein:
                the plurality of teeth receptacles are arranged in an arc around the hook receptacle;
                side edges of each of the plurality of teeth receptacles are aligned with the center point and the side edges of a given teeth receptacle are 15 arc degrees apart with respect to the center point; and
                an interior edge of each of the plurality of teeth receptacles is 10.05 mm from the center point;
    disengaging the hot stick attachment from the first hot stick; and engaging the hot stick attachment with a second hot stick comprising a second attachment interface that engages with the plurality of teeth receptacle.

11. The method of claim 10, wherein the first attachment interface of the first hot stick is a shotgun-type interface and the second attachment interface is a universal-type attachment interface.

12. The method of claim 10, the method further comprising:
disengaging the hot stick attachment from the second hot stick;
engaging the hot stick attachment with a third hot stick comprising a third attachment interface that engages with the plurality of teeth receptacles, the second attachment interface of the second hot stick is a universal-type interface and the third attachment interface of the third hot stick is a universal-type attachment interface.

13. The method of claim 10, wherein the plurality of teeth receptacles comprise five teeth receptacles.

14. A method of using a hot stick attachment comprising:
engaging a first hot stick with a hot stick attachment, the first hot stick comprising a first attachment interface, the hot stick attachment comprising:
an operative component;
an attachment component rigidly coupled to the operative component, the attachment component comprising:
a hook receptacle that receives the first attachment interface of the first hot stick, the hook receptacle is defined in part by an arc-shaped component extending from an end of the hook receptacle, an outer peripheral edge of the arc-shaped component is 10.05 mm from a center point located within the hook receptacle, the hook receptacle has a length of 11.8 mm along a first axis and 12.2 mm along a second axis perpendicular to the first axis;
a plurality of teeth receptacles, wherein:
the plurality of teeth receptacles are arranged in an arc around the hook receptacle; and
side edges of each of the plurality of teeth receptacles are aligned with the center point and the side edges of a given teeth receptacle are 15 arc degrees apart with respect to the center point; and
and an interior edge of each of the plurality of teeth receptacles is 10.05 mm from the center point disengaging the hot stick attachment from the first hot stick; and
engaging the hot stick attachment with a second hot stick comprising a second attachment interface that engages with the plurality of teeth receptacles.

15. The method of claim 14, wherein the first attachment interface of the first hot stick is a shotgun-type interface and the second attachment interface is a universal-type attachment interface.

16. The method of claim 14, the method further comprising:
disengaging the hot stick attachment from the second hot stick;
engaging the hot stick attachment with a third hot stick comprising a third attachment interface that engages with the plurality of teeth receptacles, the second attachment interface of the second hot stick is a universal-type interface and the third attachment interface of the third hot stick is a universal-type attachment interface.

17. The method of claim 14, wherein the plurality of teeth receptacles comprise five teeth receptacles.

* * * * *